(No Model.)

D. W. LOCKE.
SULKY.

No. 503,428. Patented Aug. 15, 1893.

WITNESSES
Thos. J. Routy Jr.
Jas. O'Neale

Daniel W. Locke
INVENTOR

J. S. Evans Co.
Attorneys

UNITED STATES PATENT OFFICE.

DANIEL W. LOCKE, OF BUCYRUS, OHIO.

SULKY.

SPECIFICATION forming part of Letters Patent No. 503,428, dated August 15, 1893.

Application filed May 13, 1893. Serial No. 474,101. (No model.)

*To all whom it may concern:*

Be it known that I, DANIEL W. LOCKE, a citizen of the United States, residing in Bucyrus, in the county of Crawford and State of Ohio, have invented certain new and useful Improvements in Sulkies; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
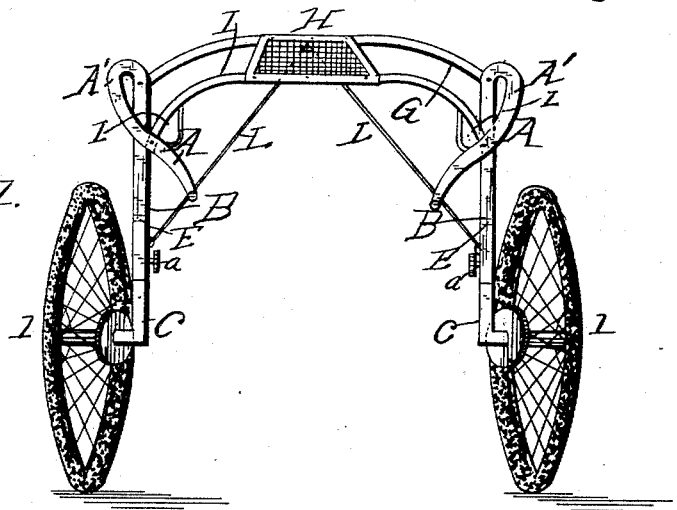
Figure 2:
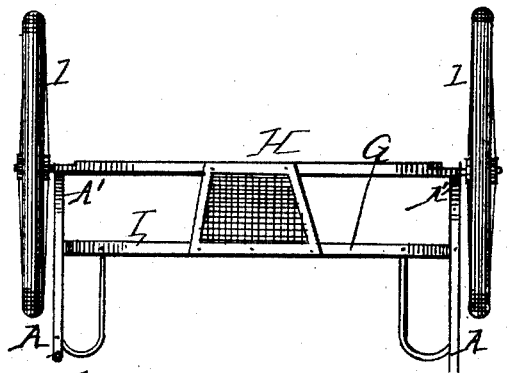
Figure 3:
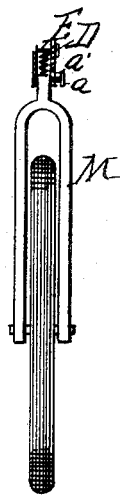
Figure 5:
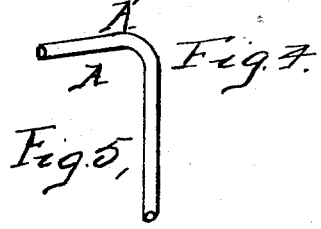
Figure 4:
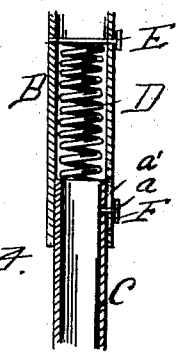

Figure 1. is a front view of my improved sulky. Fig. 2. is a plan view of a portion of the same. Fig. 3, is a detail view of a modification. Fig. 4, is a vertical sectional view illustrating the manner of securing the shafts to the axles, and Fig. 5, is a detail view of one of the shafts and its axle.

My invention relates to sulkies especially to that class adapted for speeding purposes, and it has for its object to provide a sulky of such character that will be simple and strong of construction, durable in use, and comparatively inexpensive of production.

With these objects in view the invention consists in certain features of construction and combination of parts of the same which will be hereinafter fully described and claimed.

In the accompanying drawings A, represents the shafts which are bent downwardly as shown in A', and of tubular form. These shafts have located in their lower extremities springs D, the upper movement of which is limited by a pin E. Fitted to slide in the ends of these tubular shafts are L shaped axles C, the upper ends of which bear against the springs D.

a, denotes a set screw which enters the slot a' in the lower end of the tubular shaft and engages the axle thus securely holding said screw against displacement and rotary movement. l. denotes the pneumatic wheel journaled on said axle.

G, denotes a curved cross bar suitably secured to the vertical portion of the shaft, and I, represents a similar bar arched across and secured to the rear horizontal portions of the shafts, thus securely bracing against lateral strain those parts to which they are fastened. H, denotes a seat supported by said bars, and L, denotes two brace wires secured near the lower ends of the vertical portions of the shafts and extending diagonally upward and secured to the center of the cross bar G, by means of adjustable bail, so that the lower ends of the shafts may at all times be kept in perfect alignment.

In Fig. 3, I have shown the slightly modified form of my invention, which consists in providing the tubular portions of the shafts B, with a straddle axle M, thus bringing the wheels in a line with the said vertical portions of the shafts.

From the foregoing description taken in connection with the accompanying drawings the operation and advantages of my invention will be readily understood. A sulky so constructed is light, strong and durable, and it is especially well adapted for speeding purposes.

Having thus described my invention, what I claim as new, and desire to secure by Letters Patent of the United States, is—

1. In a sulky, the combination with the shafts having their extreme ends bent downward to form vertical portions, and provided with tubular ends, and springs located in said ends, and L, shaped axles located in said ends and bearing against said springs, substantially as herein described.

2. In a sulky, the combination with the shafts having tubular downwardly extending ends provided with slots a', springs located in said tubular ends, and L shaped axles bearing against said springs, and seat screws F, to limit the movement of said axles.

3. In a vehicle, the combination with the shafts having downwardly projecting ends, axles secured thereto, wheels journaled on said axles, a curved cross bar secured to the upright of said shafts, a second curved bar secured to the horizontal portions of said shafts, a seat supported by said bars and a brace wire extending from the lower vertical portions of said shafts to one of the seat bars, and provided with a device for tightening the wire.

4. In a sulky, having adjustable springs and axles, slots and keys to hold the same into position, in combination with front and rear arches supporting the seat attached to both sides of the sulky, and stirrups by which means the driver may hold himself in position, all constructed and arranged as and for the purpose described.

DANIEL W. LOCKE.

Witnesses:
S. R. SHERER,
LILLIE ECKARD.